US008579065B2

(12) United States Patent
Bergsten et al.

(10) Patent No.: US 8,579,065 B2
(45) Date of Patent: Nov. 12, 2013

(54) MOWER WITH FOUR WHEEL STEERING AND HYDRAULIC FOUR WHEEL DRIVE

(75) Inventors: Rex R. Bergsten, Burnsville, MN (US); David H. Torborg, Eagan, MN (US); John B. Heckel, Shakopee, MN (US)

(73) Assignee: The Toro Company, Bloomington, MN (US)

( * ) Notice: Subject to any disclaimer, the term of this patent is extended or adjusted under 35 U.S.C. 154(b) by 104 days.

(21) Appl. No.: 12/879,102

(22) Filed: Sep. 10, 2010

(65) Prior Publication Data

US 2012/0060461 A1 Mar. 15, 2012

(51) Int. Cl.
*B60K 17/356* (2006.01)
(52) U.S. Cl.
USPC .................. 180/234; 180/304; 180/24.07
(58) Field of Classification Search
USPC ............................................ 180/233, 234, 242
See application file for complete search history.

(56) References Cited

U.S. PATENT DOCUMENTS

| | | | | |
|---|---|---|---|---|
| 3,303,901 A | * | 2/1967 | Schou | 180/6.2 |
| 3,583,512 A | * | 6/1971 | Praddaude | 180/306 |
| 5,533,325 A | | 7/1996 | Sallstrom et al. | |
| 5,810,106 A | * | 9/1998 | McCoy | 180/243 |
| 5,915,496 A | | 6/1999 | Bednar et al. | |
| 6,761,234 B1 | * | 7/2004 | Lamela et al. | 180/6.3 |
| 7,377,353 B2 | | 5/2008 | Smalley | |

OTHER PUBLICATIONS

The Toro Company, Patent Application portions describing a mower hydraulic drive system which system is admitted prior art.

* cited by examiner

*Primary Examiner* — Tony H. Winner
*Assistant Examiner* — Jacob Knutson
(74) *Attorney, Agent, or Firm* — James W. Miller

(57) ABSTRACT

A mower having a cutting deck for cutting grass has four drive wheels arranged in a square or rectangular configuration on the mower's frame. Four wheel drive and four wheel steering are employed with the drive wheels. The four wheel drive is provided by a hydraulic drive system that employs a pair of identical serial circuits which have their own pumps with each pump serially sending its output through a rear drive motor and a front drive motor that are catty-corner to one another on the frame, i.e. are on opposite sides of the motor. Various flow crossover paths and flow recirculation paths are provided in the serial circuits to ensure the drive motors receive adequate flow in maximum turns of the mower. The flow recirculation paths around a pair of drive motors at one end of the frame are shut off during reverse and during braking so that all drive motors retain hydraulic braking in these conditions.

15 Claims, 3 Drawing Sheets

MOWER WITH FOUR WHEEL STEERING AND HYDRAULIC FOUR WHEEL DRIVE

TECHNICAL FIELD

This invention relates to a riding mower for cutting grass, the mower having a hydraulic drive system for propulsion in forward and reverse.

BACKGROUND OF THE INVENTION

Riding mowers are well known for use in cutting grass in relatively wide swaths over a large area. Hydraulic drive systems powered by an internal combustion engine or other power source carried on the mower are also well known for propelling the mower in forward or reverse. Such drive systems often comprise individual hydraulic motors that engage each of the ground engaging wheels of the mower such that every wheel on the motor is a drive wheel. For example, mowers are known having four ground engaging wheels powered by four hydraulic motors to provide four wheel drive (4WD).

Different hydraulic fluid supply circuits can be used to power a 4WD system. One common system is an all parallel circuit in which the hydraulic motors are all connected in parallel to the hydraulic fluid source, typically a single hydraulic pump. Other systems comprise various combinations of series-parallel circuits in which some motors are connected in parallel and others are connected in series.

Each of these systems has its own advantages and disadvantages. Parallel connections provide an inherent differential effect since the motors driving the wheels on the outside of a turn will receive more flow and can rotate faster than the motors driving the wheels on the inside of the turn. Series connections can enhance traction in certain circumstances, but lose the inherent differential effect provided by a parallel connection. Series connections for mowers must be provided with some way to vary the flow passing through the motors on the insides and outsides of a turn, or alternatively to allow the wheels to overrun the motors, to avoid scrubbing of the wheels during a turn.

Various ways have been proposed to allow such flow variation in hydraulic circuits that incorporate series connections between the motors. Actively controlled valves can be used to port more flow to the motors for the wheels on the outsides of the turn as compared to motors for the wheels on the insides of the turn. However, this requires such valves to be present along with a control system for operating the valves as the mower turns. Overrunning clutches and or overrunning hydraulic check valves can be used to allow the wheels to overrun the speed of rotation of the motor shafts when necessary.

Most of the solutions known in the art for providing flow variation in circuits having series connections have been developed for use when only a single pair of the wheels on the mower, typically the front wheels, are steered. The wheels in the non-steered pair of wheels, typically the rear wheels, do not follow dramatically different paths about the center of the turn, and so the flow variation needed for the motors driving the non-steered wheels is not that extreme. However, in a mower with a pair of steerable front wheels and a pair of non-steered rear wheels, the turning radius of the mower is relatively large. Thus, it can be difficult to maneuver the mower in tight spaces without having the deck hit an obstruction, such as a wall or a tree, which the operator is attempting to mow around. Typically, the operator can get close to the obstruction, but may need to leave an uncut strip or swath of grass next to the obstruction in order to avoid hitting it.

It would be an advance in the art to provide a riding mower with four wheel steering (4WS) to shorten the turning radius and have the center of the turn be located at approximately the outer lateral edge of the cutting deck that is adjacent the obstruction. This would permit close cutting up to an obstruction without hitting the obstruction and without leaving any uncut strips of grass. However, in such a 4WS mower with a hydraulic 4WD system, the Applicants have discovered that the demand for different amounts of fluid in the motors driving the various wheels is greatly exacerbated in tight turns. In other words, the Applicants have found that the variation in the amounts of fluid needed by the various motors driving the various wheels greatly increases over the variations normally present in a two wheel steer mower. This invention is directed to providing such a mower, namely a riding mower having 4WS and a hydraulic 4WD system that incorporates at least some series connections between the motors, which can accommodate the necessary flow variations to the motors in a simple and cost-effective manner.

SUMMARY OF THE INVENTION

One aspect of this invention relates to a mower with four wheel drive. The mower comprises a frame supported for rolling over the ground by four ground engaging drive wheels comprising a pair of laterally spaced front drive wheels and a pair of laterally spaced rear drive wheels. A grass cutting device is carried on the frame. A hydraulic drive system propels the drive wheels. The drive system comprises a plurality of individual hydraulic drive motors for rotating the drive wheels with a single drive motor being operatively connected to each of the drive wheels such that a pair of front drive motors and a pair of rear drive motors are provided in the drive system. The drive system further comprises a hydraulic fluid supply circuit that includes a pair of identical serial flow circuits. Each serial flow circuit comprises a hydraulic pump that serves as a source of pressurized hydraulic fluid, the pump having an outlet that is directed in a serial manner first through a rear drive motor and then through a front drive motor for a pair of rear and front drive wheels on opposite sides of the frame, the front drive motor having an outlet that is serially connected by a return line back to an inlet of the pump.

One aspect of this invention relates to a mower with four wheel drive. The mower comprises a frame supported for rolling over the ground by four ground engaging drive wheels comprising a pair of laterally spaced front drive wheels and a pair of laterally spaced rear drive wheels. A grass cutting device is carried on the frame. A hydraulic drive system propels the drive wheels. The drive system comprises a plurality of individual hydraulic drive motors for rotating the drive wheels with a single drive motor being operatively connected to each of the drive wheels such that a pair of front drive motors and a pair of rear drive motors are provided in the drive system. The drive system further comprises a pair of serial hydraulic flow circuits with each serial flow circuit directing pressurized hydraulic fluid in a serial manner through one front drive motor and one rear drive motor. One drive motor in each serial flow circuit is provided with a return recirculation path protected by a check valve which check valve opens to allow hydraulic fluid leaving the one drive motor through an outlet thereof to flow back to an inlet of the front drive motor to permit the one drive motor to speed up during turns of the mower if the drive wheel to which the one drive motor is coupled is on an outside of the turn. The return recirculation paths in the pair of serial flow circuits are shut off when the mower is being operated in reverse or when the mower is being braked by the operator retarding the speed of rotation of the drive motors such that hydraulic braking is maintained on the drive wheels whose motors have the return recirculation paths.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
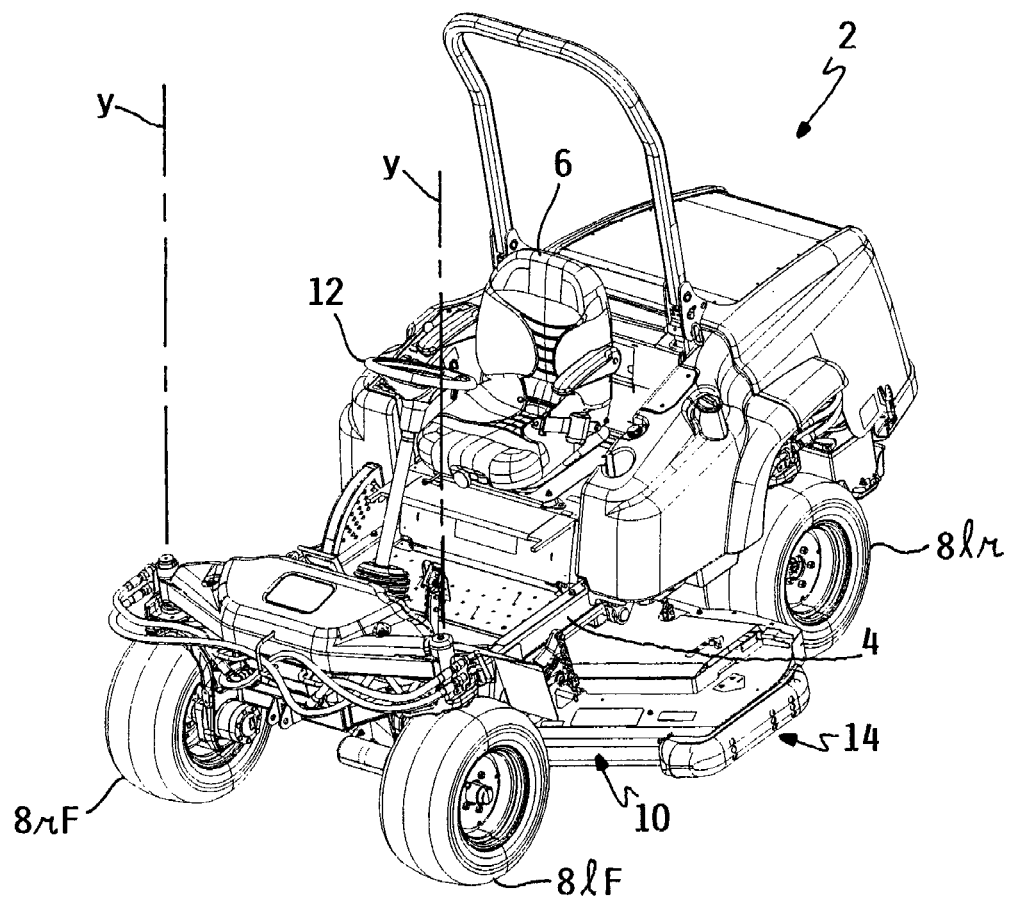
FIG. 1 is a perspective view of a riding mower according to this invention.

Referring first to FIG. 1, a riding mower according to this invention is generally illustrated as 2. Mower 2 comprises a frame 4 that carries a power source (not shown), such as an internal combustion engine, electric motor/battery pack, or hybrid combination of the two. Frame 4 includes a seat 6 for carrying a seated operator who guides and controls mower 2 during a grass cutting operation. Frame 4 is supported for rolling over the ground by a plurality of ground engaging wheels comprising a left rear wheel 8*lr*, a left front wheel 8*lf*, a right front wheel 8*rf*, and a right rear wheel 8*rr*. A rotary grass cutting deck 10 having a plurality of grass cutting blades (not shown) rotating in substantially horizontal cutting planes is located underneath the middle of frame 4, in what is generally referred to as a mid-mount location, between the front and rear wheels. The type of mower depicted in FIG. 1 is generally well known.

Figure 2:
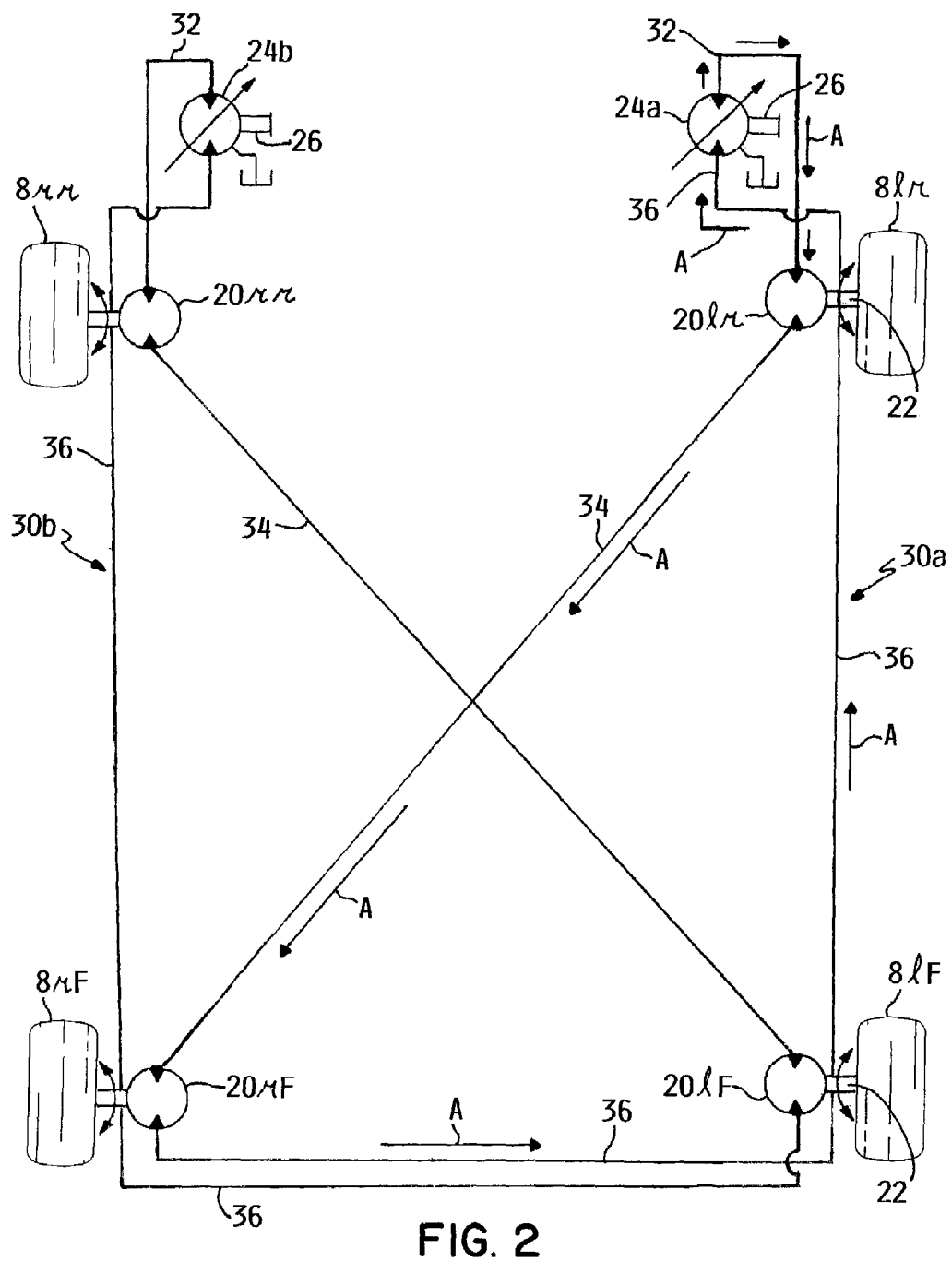
FIG. 2 is a partial hydraulic circuit diagram for the mower of FIG. 1, particularly illustrating the operation of the two series circuits that power pairs of catty-corner oriented drive wheels carried on the mower, the drive wheels of the mower being shown disposed for providing straight ahead travel.
Figure 3:
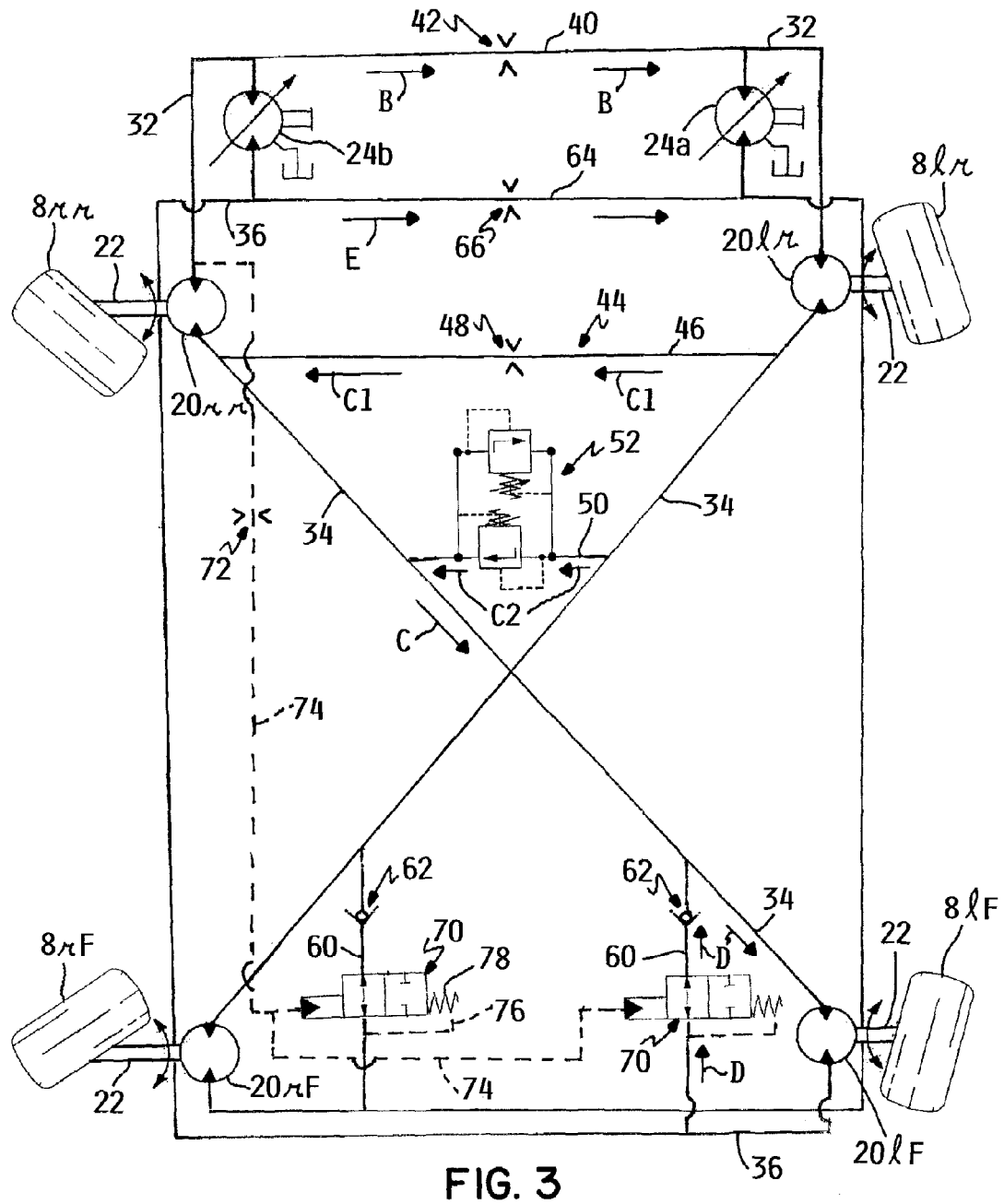
FIG. 3 is a hydraulic circuit diagram similar to that of FIG. 2 but comprising a complete hydraulic circuit diagram for the mower of FIG. 1, particularly illustrating the rest of the hydraulic circuit including the various flow paths for allowing flow to be routed to those drive motors in the circuit that require higher amounts of flow during turns of the mower, the drive wheels of the mower being shown in FIG. 3 disposed for providing a maximum right hand turn.

Mower 2 is equipped with a steering wheel 12 adjacent operator's seat 6 to allow the operator to steer mower 2. A four wheel steering (4WS) system is used on mower 2 such that turning or rotating steering wheel 12 causes each wheel 8 on mower 2 to pivot about a substantially vertical axis. FIG. 2 depicts wheels 8 in a straight ahead orientation. FIG. 3 depicts wheels 8 in a full turn to the right with the pairs of front and rear wheels rotating in opposite directions about their vertical steering axes, i.e. the pair of front wheels rotating clockwise and the pair of rear wheels rotating counter-clockwise in FIG. 3 from the positions they occupied in FIG. 2. In addition, wheels 8 are arranged so that a wheel 8 on the inside of the turn rotates more sharply than a wheel 8 on the outside of the turn. Any suitable steering linkages, including power steering linkages in which the pairs of front and rear wheels are pivoted by hydraulic cylinders or the like, may be used to effect steering of the front and rear wheels in the manner shown in FIG. 3.

In a full right hand turn as shown in FIG. 3, straight lines that extend through the horizontal stub axles that mount the front and rear wheels will intersect at a common point about which mower 2 pivots when executing the turn, this axis representing the center of the turn. In a full right hand turn, this pivot point is located along a right side of cutting deck 10 slightly offset to the rear of cutting deck 10 and being substantially laterally located along a right edge of cutting deck 10. The opposite will occur during a full left hand turn, namely the pivot point, indicated as 14 in FIG. 1, will be symmetrically located approximately in line with a left edge of cutting deck 10 generally in the position shown in FIG. 1. This 4WS geometry ensures that an operator can easily maneuver mower 2 up to and cut closely around an obstruction without striking the obstruction.

A hydraulic four wheel drive (4WD) system is provided on frame 4 for powering or driving each wheel 8. In other words, each wheel 8 of mower 2 is not only a support wheel but a drive wheel as well. FIGS. 2 and 3 show various details of the 4WD system.

In the 4WD system of this invention, each drive wheel 8 is powered by its own individual hydraulic motor 20. Thus, left rear drive wheel 8*lr* is powered by a left rear hydraulic motor 20*lr*, left front drive wheel 8*lf* is powered by a left front hydraulic motor 20*lf*, right front drive wheel 8*rf* is powered by a right front hydraulic motor 20*rf*, and right rear drive wheel 8*rr* is powered by a right rear hydraulic motor 20*rr*. Each motor 20 is carried on its corresponding drive wheel 8 to pivot with drive wheel 8 as drive wheel 8 pivots about its vertical steering axis y. Each drive motor 20 has an output shaft 22 that rotates the adjacent drive wheel 8. Note that the representation of FIG. 3 showing motors 20 and their output shafts 22 as remaining stationary while wheels 8 pivot or steer is not accurate as motors 20 and their output shafts 22 actually pivot with wheels 8 as wheels 8 steer. However, FIG. 3 is diagrammatic in form and drive motors 20 are left stationary in FIG. 3 for the purpose of clarity in trying to show the hydraulic circuit that supplies such motors with pressurized hydraulic fluid.

Referring first to FIG. 2, the hydraulic circuit that powers drive motors 20 comprises first and second, variable displacement, hydraulic pumps 24*a* and 24*b*. Pumps 24 have input shafts 26 that are rotated via drive transmission systems, such as belt and pulley drives, from the output shaft of the power source. When pumps 24 are driven and the swash plates on pumps 24 are advanced out of a neutral position, they supply pressurized fluid flow to drive motors 20 to cause drive motors 20 to rotate. As pumps 24 have a variable displacement from zero to some maximum displacement, the operator can control the propulsion speed of mower 2 by varying the pump displacements using a suitable control, such as an accelerator pedal (not shown). Pumps 24*a* and 24*b* are bi-directional to provide propulsion in both forward and reverse with the pump outlets and inlets in forward becoming reversed in operation when the mower is moving in reverse, i.e. the forward pump outlet becomes the reverse pump inlet and the forward pump inlet becomes the reverse pump outlet.

Each pump 24 is connected to a pair of drive wheels 20 in a series circuit 30. Thus, for example, first pump 24*a* of first series circuit 30*a* has an output line 32 that serially connects to the inlet of left rear drive motor 20*lr*, the outlet of left rear drive motor 20*lr* is then serially connected by a series line 34 in a catty-corner manner to the inlet of right front drive motor 20*rf*, and then the outlet of right front drive motor 20*rf* is serially connected by a return line 36 to the inlet of first pump 24*a*. The flow from first pump 24*a* through the two drive motors serially supplied by first pump 24*a* has been shown by the arrows A in FIG. 2. Second pump 24*b* and the remaining two drive motors are serially connected to each other in a similar manner, namely second pump 24b serially feeds its output through right rear drive motor 20rr and then through left front drive motor 20lf with the flow returning back to second pump 24b from left front drive motor 20lf along a return line. Series circuits 30a and 30b are identical to each other but comprise mirror images of each other.

The basic pump and wheel motor plumbing shown in FIG. 2 helps ensure that mower 2 will retain traction even under adverse traction conditions. For example, considering either of the series circuits 30a or 30b shown in FIG. 2, if one drive wheel 8 in that circuit starts to lose traction or slip, the entire serial flow still passes through the drive motor 20 for the other drive wheel 8, which is in fact a drive wheel 8 that is located on the opposite side of mower 2. It is unlikely that both drive wheels 8 located at opposite corners of frame 4 will simultaneously encounter the same traction conditions. Thus, even if one wheel 8 is slipping, the other wheel 8 in that series circuit 30 has likely got better traction and the serial flow through the motor 20 of that other wheel 8 will likely keep propelling mower 2.

In addition, even in the unlikely event that both drive wheels 8 in one of the series circuits 30 simultaneously lose traction and slip, the presence of the other series circuit 30, namely the other pump that is also serially powering drive motors 20 for the remaining pair of catty-corner arranged drive wheels 8, provides a redundancy in traction that is likely to keep mower 2 moving. It is extremely unlikely that all four drive wheels 8 will find themselves in conditions in which they all slip at once. At least one drive wheel 8, and more likely more than one drive wheel 8, in at least one of the series circuits 30 is likely to retain traction. Thus, mower 2 of this invention will have very good traction even in adverse conditions.

When mower 2 is operating in straight ahead mode with all four drive wheels 8 having traction, the hydraulic flow through the two series circuits 30a and 30b will be equal. Pumps 24 are preferably sized identically to one another. Each pump 24 will output the same flow and this flow will pass serially and equally through each drive motor 8 in the pair of drive motors fed by the pump. The representation of FIG. 2 shows only a portion of the hydraulic circuit, namely the two pumps 24 and the two series circuits 30 fed by those pumps, and has been presented to provide the reader hereof with an understanding of the basic hydraulic fluid supply when mower 2 is traveling straight ahead. FIG. 3 shows the remaining portions of the hydraulic circuit when mower 2 is disposed in a full right hand turn.

Referring now to FIG. 3, when mower 2 turns sharply to the right in a full right hand turn, drive wheels 8 are placed in substantially canted positions as shown in FIG. 3. Each drive wheel 8 has to follow an arc that is located at a different distance from the pivot axis of the turn. For a full right hand turn, right rear drive wheel 8rr is closest to the pivot axis, right front drive wheel 8rf is second closest to the pivot axis, left rear drive wheel 8lr is third closest to the pivot axis, and left front drive wheel 8lf is furthest from the pivot axis. Thus, each drive motor 20 for each drive wheel 8 now requires a different amount of flow relative to the other drive motors as shown in the following comparative table where x is the amount of flow in gallons per minute needed for the motor requiring the least flow, namely right rear drive motor 20rr:

| Drive Motor | Flow Amount |
| --- | --- |
| Right Rear Drive Motor 20rr | 1.00x |
| Right Front Drive Motor 20rf | 1.56x |
| Left Rear Drive Motor 20rr | 2.40x |
| Left Front Drive Motor 20lf | 2.70x |

In order to accommodate these substantially different flow requirements, the hydraulic circuit includes a pump output crossover path 40 placed between the output lines 32 of the first and second pumps with a first orifice 42 being placed in pump output crossover path 40. First orifice 42 has a fixed diameter that is sized to allow a portion, but not all, of the flow from second pump 24b to crossover and join the flow from first pump 24a to supply the additional flow requirements of left rear drive motor 20lr. This additional flow in pump output crossover path 40 is represented by the arrows B in FIG. 3. First orifice 42 is sized to allow a maximum crossover flow B of the amount needed to just adequately supply left rear drive motor 20lr in a full right hand turn, which maximum crossover flow B in the example set forth in the table above can comprise approximately 40% of the full pumping capacity of second pump 24b.

Now, considering the two front drive motors, the flow output from second pump 24b, which is headed towards left front drive motor 20lf, has been reduced by the amount of the pump crossover flow B described in the previous paragraph. However, left front drive motor 20lf, to which this reduced flow is being directed, actually needs the most flow of all drive motors 20. Accordingly, there is a rather large deficit in flow that must be made up or compensated for in some fashion.

The flow deficit for left front drive motor 20lf is made up from various sources. The first increment of deficit flow makeup arises from the realization by the Applicants that the amount of flow exiting left rear drive motor 20lr, which is receiving 2.40x due to the pump output crossover path 40, is substantially more than the amount of flow, i.e. 1.56x, required by right front drive motor 20rf. This abundance or excess of flow is siphoned off or removed in a series crossover path, represented generally as 44, that bridges across the series flow lines 34 connecting the front and rear drive motors in each series circuit 30.

Series crossover path 44 includes two parts: 1.) a first crossover flow sub-path 46 through a second orifice 48 of fixed diameter; and 2) a second crossover flow sub-path 50 through a bidirectional pressure relief valve 52 (or a pair of oppositely opening pressure relief valves 52). In a maximum right hand turn, enough flow can crossover between the series circuits through the first and second crossover flow sub-paths 46 and 50 such that substantially the entire excess of flow exiting the outlet of left rear drive motor 20lr is diverted into the other series circuit 30b, namely into the fluid supply line going to left front drive motor 20lf. Referring to FIG. 3, a first increment of crossover flow C1 is shown passing through second orifice 48 and a second increment of crossover flow C2 is shown passing through the open side of pressure relief valve 52. Pressure relief valve 52 is shown in FIG. 3 as having been opened by high pressure on one side to pass flow through in the same direction as the flow passing through second orifice 48. These two increments of crossover flow, namely the increments C1 and C2, together will make up the entire series crossover flow C, which itself equals the excess of flow passing in the series circuit 30a between left rear drive motor 20lr and right front drive motor 20rf.

However, due to the extremely different amounts of flow required by the various drive motors, the series crossover flow C, while substantial and representing about 50% of the capacity of the pump 24, is still not enough to provide the flow requirements for left front drive motor 20*lf*. Accordingly, a return recirculation path 60 is provided between the outlet and the inlet of left front drive motor 20*lf*, effectively allowing enough of the return flow passing away from left front drive motor 20*lf* to be recirculated back to the inlet of left front drive motor 20*lf*. The flow in return recirculation path 60, as represented by the arrows D in FIG. 3, is protected by a one way check valve 62. Check valve 62 opens only in a direction to permit the flow recirculation D when left front drive motor 20*lf* needs more fluid, namely whenever the flow coming from right rear drive motor 20*rr* plus the series crossover flow C is less than the instantaneous flow requirements of left front drive motor 20*lf*.

In many slight or moderate right hand turns of mower 2, the return recirculation flow D described above will not occur. In such slight or moderate turns, the amount of flow from the series crossover flow C when added to the flow exiting right rear drive motor 20*rr* will be enough to supply left front drive motor 20*lf*. Only in severe right hand turns or in a maximum right hand turn will there be a need for check valve 62 in return recirculation path 60 to open to add the additional return recirculation flow D to the crossover flow C.

In the situation shown in FIG. 3 of a maximum right hand turn, so much flow has been diverted into the series circuit 30*b* that ultimately feeds left front drive motor 20*lf* that there is a flow imbalance in the return lines 36 heading back to the first and second pumps. This flow imbalance is allowed to equalize itself in this situation by a pump return crossover path 64 having a third orifice 66 that bridges between the return lines 36 to the first and second pumps. When mower 2 is operating in a forward direction, the only purpose of the flow in pump return crossover path 64, indicated by the arrows E in FIG. 3, is simply to return as much flow to each pump as the pump is outputting. For example, if each pump 24 is pumping at a given capacity in gallons per minute, the same number of gallons per minute must return to each pump 24 regardless of how much crossover flow C has been allowed to pass from one series circuit to the other. The return crossover flow E allows this to happen.

FIG. 3 shows the various flow arrows B-E as they would appear when mower 2 is executing a maximum right hand turn. The hydraulic circuit of FIG. 3 will operate symmetrically in a mirror image fashion when mower 2 is executing a maximum left hand turn.

Each of the return recirculation paths 60 for series circuits 30*a* and 30*b* can be placed on or off by a piloted on-off valve 70. One side of on-off valve 70 receives a pilot pressure through a fourth orifice 72 from the output side of one pump 24 as indicated by the dotted pilot pressure supply line 74 in FIG. 3. This pilot pressure acts in a direction to open on-off valve 70 to thereby open return recirculation path 60. The other side of on-off valve 70 is acted on by return pressure along line 76 and by a closing spring 78. When mower 2 is operating in a forward direction, the piloted output pressure in forward along line 74 is sufficient to overcome the return pressure along line 76 and the bias of spring 78 seen by the other side of on-off valve 70 such that on-off valves 70 are both piloted to their open positions during forward operation of mower 2, as illustrated in FIG. 3. With both on-off valves 70 in their open positions, both return recirculation paths 60 are ready and able to be used as need be during right or left hand turns of mower 2.

However, when mower 2 operates in reverse or when mower 2 is being braked by the operator by reducing the depression on accelerator pedal 28, the two on-off valves 70 will close as the combination of the pressure along line 76 and the bias of spring 78 will now be sufficient to move valves 70 to their closed positions. In such closed positions, return recirculation paths 60 are now shut off and cannot be used to bridge between the lines 34 and 36 around the respective right front drive motor 20*rf* and left front drive motor 20*lf*. This ensures that hydraulic braking will be maintained on all four drive wheels, both the front drive wheels and the rear drive wheels, when operating in reverse or when the operator consciously wishes to slow down in forward by letting up on accelerator pedal 28. Hydraulic braking will be maintained on the front drive wheels since the fluid recirculation path 60 around each front drive wheel, which otherwise would permit a freewheeling of each front drive wheel, is closed and thus cannot supply the additional recirculation fluid needed to accomplish this freewheeling. The front drive wheels 8 are compelled to rotate at whatever speed is being commanded by the operator and hydraulic braking is thus maintained on the front drive wheels in reverse or when braking.

Various modifications of this invention will be apparent to those skilled in the art. Thus, the scope of this invention will be limited only by the appended claims.

We claim:

1. A mower with four wheel drive, which comprises:
    (a) a frame supported for rolling over the ground by four ground engaging drive wheels comprising a pair of laterally spaced front drive wheels and a pair of laterally spaced rear drive wheels;
    (b) a grass cutting device carried on the frame; and
    (c) a hydraulic drive system for propelling the drive wheels, which comprises:
        (i) a plurality of individual hydraulic drive motors for rotating the drive wheels with one drive motor being operatively connected to each of the drive wheels such that the plurality of drive motors comprise a pair of front drive motors for the front drive wheels and a pair of rear drive motors for the rear drive wheels;
        (ii) a hydraulic fluid supply circuit that comprises:
            a pair of identical serial flow circuits, wherein each serial flow circuit comprises a hydraulic pump that serves as a source of pressurized hydraulic fluid, the pump having an outlet that is directed in a serial manner first through one rear drive motor and then through one front drive motor for one pair of rear and front drive wheels on opposite sides of the frame, the front drive motor having an outlet that is serially connected by a return line back to an inlet of the pump; and
            a crossover path between the outputs of the pumps, wherein the pump output crossover path contains an orifice that is sized to allow a maximum of substantially enough flow to crossover from one pump output to the other pump output such that whatever rear drive motor for the rear drive wheel is on an outside of a maximum turn receives adequate flow to permit smooth rotation of the rear drive wheel on the outside of the maximum turn without scrubbing or skidding of the rear drive wheel.

2. The mower of claim 1, wherein the front drive motor in each serial flow circuit is provided with a return recirculation path protected by a check valve which check valve opens to allow hydraulic fluid leaving the front drive motor through the outlet thereof to flow back to an inlet of the front drive motor to permit the front drive motor to speed up during turns of the mower if the front drive wheel to which the front drive motor is coupled is on an outside of the turn.

3. The mower of claim 2, wherein the return recirculation paths around the pair of front drive motors are shut off when the mower is being operated in reverse or when the mower is being braked by the operator retarding the speed of rotation of the drive motors such that hydraulic braking is maintained on the front drive wheels.

4. The mower of claim 3, wherein an on-off valve is placed in each return recirculation path.

5. The mower of claim 4, wherein the on-off valve is automatically placed in an open position during forward motion of the mower and is automatically placed in an off position during reverse motion of the mower and during braking of the mower without the need for operator intervention.

6. The mower of claim 5, wherein the on-off valve is piloted to an open position by output pressure of one of the pumps in one of the serial circuits when the mower is being operated in a forward direction which output pressure is sufficient to open the on-off valve against the bias of a spring and against pressure in the return line in the return recirculation path, the bias of the spring and the pressure in the return line in the return recirculation path becoming stronger and overpowering the output pressure when the mower is in reverse and is being braked.

7. The mower of claim 1, further including a four wheel steering system for pivoting each of the drive wheels about a substantially vertical pivot axis with respect to each wheel with the front drive wheels pivoting about their pivot axes in a direction opposite to that of the rear drive wheels.

8. The mower of claim 1, wherein the hydraulic fluid supply circuit further includes a crossover path in the serial circuits at a location between the front and rear drive motors in the circuits, the series crossover path comprising a fixed orifice and bi-directional pressure relief valving that is sized to allow an excess increment of flow in the serial circuit feeding the drive motor for the front drive wheel on an inside of the maximum turn to be diverted into the serial circuit feeding the drive motor for the front drive wheel on the outside of the maximum turn.

9. The mower of claim 8, wherein the front drive motor in each serial flow circuit is provided with a return recirculation path protected by a check valve which check valve opens to allow hydraulic fluid leaving the front drive motor through the outlet thereof to flow back to an inlet of the front drive motor to permit the front drive motor to speed up during maximum turns of the mower if the front drive wheel to which the front drive motor is coupled is on the outside of the maximum turn.

10. The mower of claim 9, wherein the return recirculation paths in the serial circuits are shut off except during forward, unbraked motion of the mower.

11. The mower of claim 9, further including a crossover path between the inlets of the pumps, wherein the pump inlet crossover path has an orifice that permits return flow in the serial circuits returning to the pumps to crossover from one serial circuit to the other serial circuit to balance the return flows to the inlets of the pumps.

12. A mower with four wheel drive, which comprises:
(a) a frame supported for rolling over the ground by four ground engaging drive wheels comprising a pair of laterally spaced front drive wheels and a pair of laterally spaced rear drive wheels;
(b) a grass cutting device carried on the frame; and
(c) a hydraulic drive system for propelling the drive wheels, which comprises:
(i) a plurality of individual hydraulic drive motors for rotating the drive wheels with one drive motor being operatively connected to each of the drive wheels such that the plurality of drive motors comprise a pair of front drive motors for the front drive wheels and a pair of rear drive motors for the rear drive wheels;
(ii) a pair of serial hydraulic flow circuits, each serial flow circuit directing pressurized hydraulic fluid in a serial manner through one front drive motor and one rear drive motor;
(iii) wherein one drive motor in each serial flow circuit is provided with a return recirculation path protected by a check valve which check valve opens to allow hydraulic fluid leaving the one drive motor through an outlet thereof to flow back to an inlet of the front drive motor to permit the one drive motor to speed up during turns of the mower if the drive wheel to which the one drive motor is coupled is on an outside of the turn; and
(iv) wherein the return recirculation paths in the pair of serial flow circuits are shut off when the mower is being operated in reverse or when the mower is being braked by the operator retarding the speed of rotation of the drive motors such that hydraulic braking is maintained on the drive wheels whose motors have the return recirculation paths.

13. The mower of claim 12, wherein the front and rear drive wheels powered by the front drive motor and rear drive motor in each serial flow circuit are on opposite sides of the mower frame.

14. The mower of claim 13, wherein each serial flow circuit sends the pressurized fluid first through the rear drive motor and then through the front drive motor in a forward direction of motion of the mower frame.

15. A mower with four wheel drive, which comprises:
(a) a frame supported for rolling over the ground by four ground engaging drive wheels comprising a pair of laterally spaced front drive wheels and a pair of laterally spaced rear drive wheels;
(b) a grass cutting device carried on the frame; and
(c) a hydraulic drive system for propelling the drive wheels, which comprises:
(i) a plurality of individual hydraulic drive motors for rotating the drive wheels with one drive motor being operatively connected to each of the drive wheels such that the plurality of drive motors comprise a pair of front drive motors for the front drive wheels and a pair of rear drive motors for the rear drive wheels;
(ii) a hydraulic fluid supply circuit that comprises:
a pair of identical serial flow circuits, wherein each serial flow circuit comprises a hydraulic pump that serves as a source of pressurized hydraulic fluid, the pump having an outlet that is directed in a serial manner first through one drive motor for a drive wheel on a first end of the frame and then through one drive motor for a drive wheel on an opposite end of the frame for one pair of rear and front drive wheels on opposite sides of the frame, the drive motor for the drive wheel on the opposite end of the frame having an outlet that is serially connected by a return line back to an inlet of the pump; and
a crossover path between the outputs of the pumps, wherein the pump output crossover path contains an orifice that is sized to allow a maximum of substantially enough flow to crossover from one pump output to the other pump output such that whatever drive motor for the drive wheel on the one end of the frame that is on an outside of a maximum turn receives adequate flow to permit smooth rotation of the drive wheel on the one end of the frame on the outside of the maximum turn without scrubbing or skidding of the drive wheel on the one end of the frame on the outside of the maximum turn.

* * * * *

UNITED STATES PATENT AND TRADEMARK OFFICE
CERTIFICATE OF CORRECTION

| | | |
|---|---|---|
| PATENT NO. | : 8,579,065 B2 | Page 1 of 1 |
| APPLICATION NO. | : 12/879102 | |
| DATED | : November 12, 2013 | |
| INVENTOR(S) | : Rex R. Bergsten et al. | |

It is certified that error appears in the above-identified patent and that said Letters Patent is hereby corrected as shown below:

In the Claims

Col. 10, Line 13, change "front" to --one--.

Signed and Sealed this
Twenty-eighth Day of January, 2014

Michelle K. Lee
*Deputy Director of the United States Patent and Trademark Office*